US012565911B2

(12) United States Patent
Lin

(10) Patent No.: US 12,565,911 B2
(45) Date of Patent: Mar. 3, 2026

(54) FOLDING JOINT FOR FRAME AND WORKTABLE

(71) Applicant: UNI-SPLENDOR CORPORATION, Tainan City (TW)

(72) Inventor: Yu-Yuan Lin, Tainan City (TW)

(73) Assignee: Uni-Splendor Corporation, Tainan City (TW)

( * ) Notice: Subject to any disclaimer, the term of this patent is extended or adjusted under 35 U.S.C. 154(b) by 386 days.

(21) Appl. No.: 18/500,253

(22) Filed: Nov. 2, 2023

(65) Prior Publication Data

US 2025/0146525 A1    May 8, 2025

(51) Int. Cl.
*F16C 11/10*    (2006.01)
*B25H 1/04*    (2006.01)
(52) U.S. Cl.
CPC ............... *F16C 11/10* (2013.01); *B25H 1/04* (2013.01)
(58) Field of Classification Search
CPC ......... F16C 11/04; F16C 11/045; F16C 11/10; F16B 2/06; F16B 2/10; F16B 7/22; F16B 21/02; B25H 1/02; B25H 1/04; A47J 2037/0777; A47J 37/0763; F24C 3/14
See application file for complete search history.

(56) References Cited

U.S. PATENT DOCUMENTS 4,540,306 A * 9/1985 Wang ......................... E06C 1/32
16/334
4,645,371 A * 2/1987 Wang ....................... F16C 11/10
182/163
5,026,198 A * 6/1991 Lin ............................ E06C 1/32
182/163
6,322,098 B1 * 11/2001 Lan ........................... B62B 7/08
280/42
7,690,408 B2 * 4/2010 Sugiura .................... B25H 1/16
144/287
9,096,247 B2 * 8/2015 Witzel .................. A47J 37/049
9,186,736 B1 * 11/2015 Chang ...................... B62B 1/10
9,187,108 B2 * 11/2015 Bruno ..................... B62B 1/264
9,902,417 B2 * 2/2018 Storm .................... B62B 7/083
10,737,375 B2 * 8/2020 Zhu .......................... B25H 1/16
(Continued)

FOREIGN PATENT DOCUMENTS

DE      2206681 A1 * 8/1972
DE      19633691 A1 * 2/1997 ............... E06C 1/32
(Continued)

*Primary Examiner* — Jonathan P Masinick
(74) *Attorney, Agent, or Firm* — Rosenberg, Klein & Lee

(57) ABSTRACT

A folding joint for frames and worktables composed of a control portion and a joint portion is provided. The control portion includes a base provided with a moveable slot and a shaft inserted through the moveable slot. Two ends of the shaft are connected with a moveable seat and a hook correspondingly. The hook is for control of a lock cylinder of the joint portion. The lock cylinder is mounted in an outer tube, inserted through an upper rotary arm, and mounted in a lower rotary arm to be locked. The upper and lower rotary arms are pivotally joined. Thus the hook is driven to make the lock cylinder release from the lower rotary arm and unlock when the moveable seat of the control portion is pulled and moved. Thereby the joint portion is moved freely and folded. The folding joint is convenient to operate and easy to control.

13 Claims, 10 Drawing Sheets

(56)  References Cited

U.S. PATENT DOCUMENTS

| 11,503,952 | B2 * | 11/2022 | Hunt | ....................... | F16M 11/42 |
| 2012/0187272 | A1 * | 7/2012 | Lee | ......................... | B25H 1/04 |
| | | | | | 248/647 |
| 2025/0237386 | A1 * | 7/2025 | Lin | ..................... | A47J 37/0713 |

FOREIGN PATENT DOCUMENTS

| EP | 1787766 | A1 * | 5/2007 | .............. | B25H 1/04 |
| TW | 202772 | U | 3/1993 | | |

* cited by examiner

FOLDING JOINT FOR FRAME AND WORKTABLE

BACKGROUND OF THE INVENTION

Field of the Invention

The present invention relates to a folding joint for frames and worktables, especially to a folding joint for frames and worktables able to be applied to various mechanisms for compact volume after folding, less storage space, and lower transportation cost.

Description of Related Art

Generally, trolleys such as baby trolleys, cargo trolleys, food trolleys, wheelchairs, pet trolleys, or multi-function trolleys are widely used. No matter which kind of trolley is used, the trolley has a certain volume. Thus most of the trolleys are foldable for convenient storage purposes.

While not in use, the best state of the trolleys for storage is the folded state. For example, a barbecue grill is used while grilling food. The barbecue grill mainly includes a grill body, a barbecue grill mesh, and legs fastened under the grill body and used for support. The common barbecue grill is in a fixed shape. The grill body and the legs are unable to be folded so that a lot of space is taken up. Moreover, conventional food trolleys are unable to be detached and having large volume. Thus a lorry is used for transportation instead of a van. As to a general shopping cart, it has complicate structure and the assembly is not easy. A basket of the shopping cart is formed by a plurality of plates/sheets and non-collapsible so that the shopping cart which takes up certain space is inconvenient to store. The above designs all cause trouble in use and space for storage. Thus there is room for improvement and there is a need to provide a novel foldable design used in mechanisms such as conventional food trolleys and other trolleys.

SUMMARY OF THE INVENTION

Therefore, it is a primary object of the present invention to provide a folding joint for frames and worktables, which is locked and unlocked by convenient operation and able to be applied to various mechanisms for compact volume after folding, less storage space, and lower transportation cost.

In order to achieve the above object, a folding joint for frames and worktables according to the present invention mainly includes a control portion and a joint portion. The control portion is provided with a base while a moveable slot is mounted on the base and a shaft is inserted through the moveable slot. One end of the shaft is mounted to a moveable seat while the other end of the shaft is assembled with a hook used for control of a lock cylinder of the joint portion correspondingly. The lock cylinder is mounted in an outer tube, inserted through an upper rotary arm arranged under the outer tube, and mounted in a lower rotary arm to be locked. The upper rotary arm and the lower rotary arm are pivotally joined with each other. Thereby the hook is driven to make the lock cylinder release from the lower rotary arm and unlock when the moveable seat of the control portion is pulled and moved. Thus the joint portion can be moved freely and folded for storage. Thereby folding joint is convenient to operate and easy to control. The folding joint for frames and worktables can be applied to various mechanisms with functions of compact volume after folding, less storage space, and lower transportation cost.

Preferably, a first return spring is arranged between the base and the moveable seat. A second return spring is mounted between the base and the hook while a third return spring is disposed between the lock cylinder and the upper rotary arm.

Preferably, the moveable slot is obliquely disposed on the base.

Preferably, a fool-proofing pin is disposed on the base while a notch is mounted on the moveable seat and corresponding to the fool-proofing pin in a staggered manner. The movable seat can only be pulled to be moved and unlocked when the moveable seat is pushed to be aligned with the notch by users. The moveable seat will not be unlocked once being touched accidentally by users while in use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
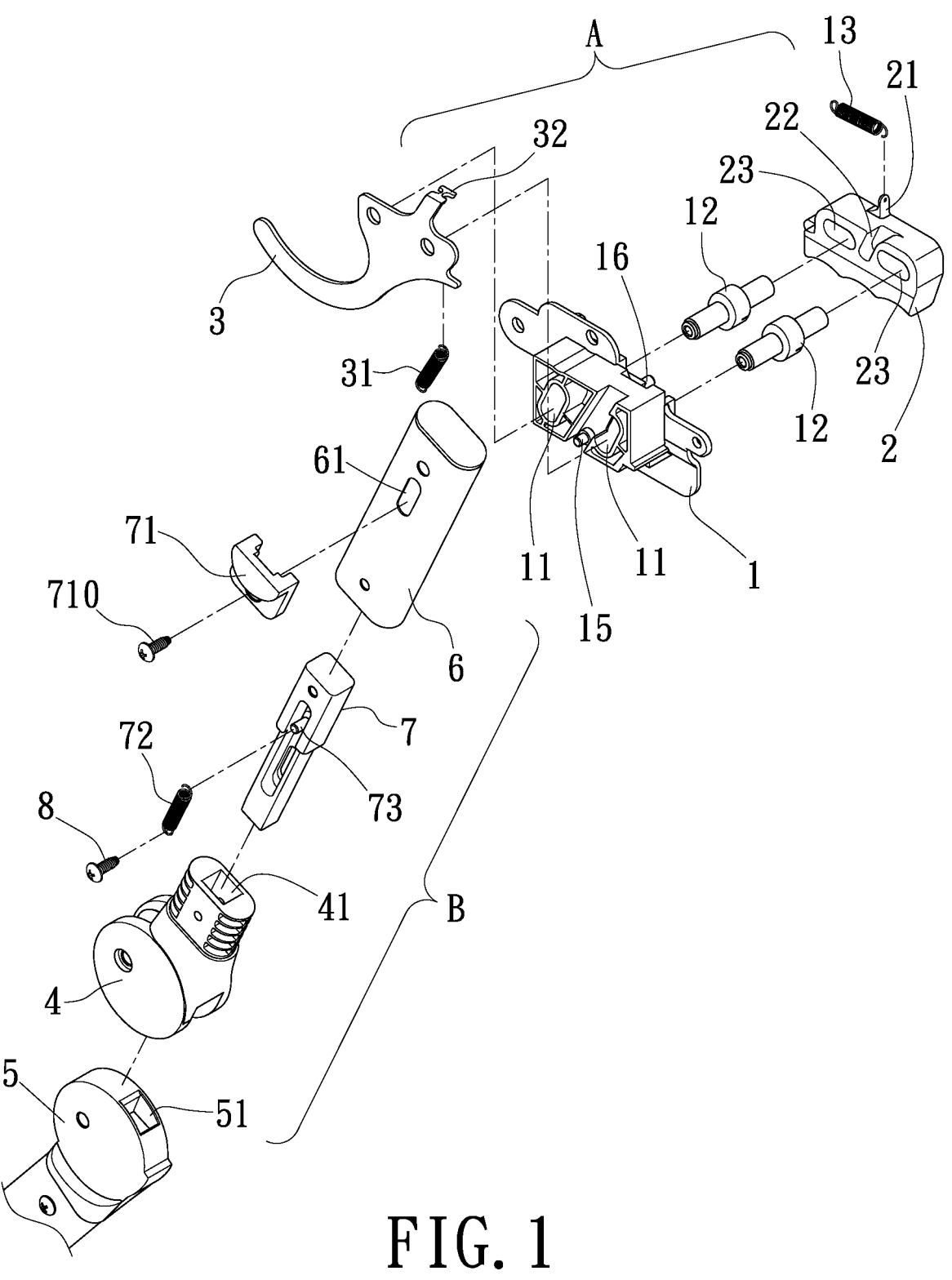
FIG. 1 is an exploded view of an embodiment according to the present invention.
Figure 2:
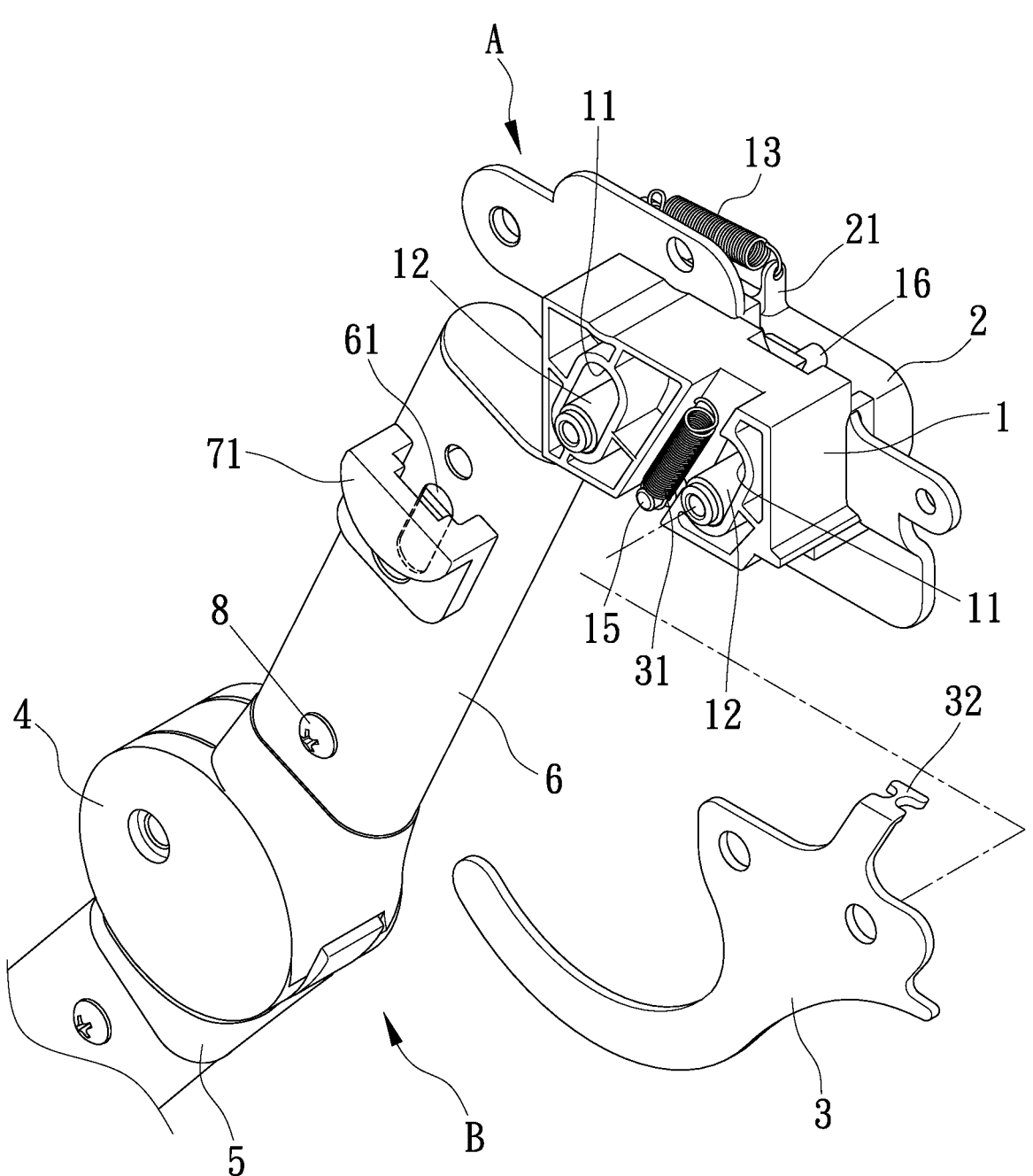
FIG. 2 is another exploded view of an embodiment according to the present invention.
Figure 3:
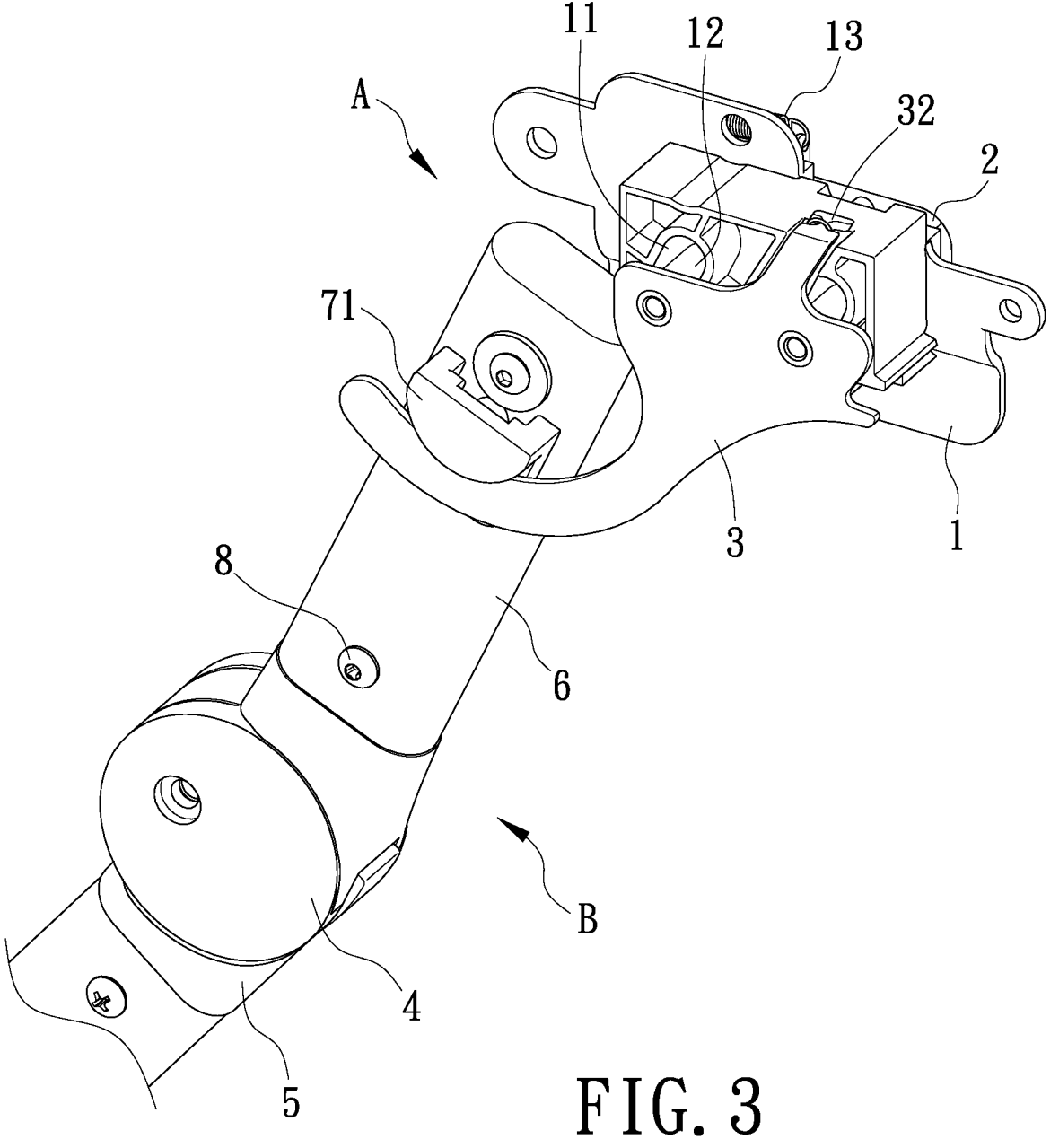
FIG. 3 is a perspective view of an embodiment according to the present invention.

Refer to FIG. 1 and FIG. 2, a folding joint for frames and worktables according to the present invention mainly includes a control portion A and a joint portion B. The control portion A consists of a base 1, a moveable seat 2, and a hook 3. As to the joint portion B, it is composed of an upper rotary arm 4, a lower rotary arm 5, and an outer tube 6 disposed on the upper rotary arm 4. The upper rotary arm 4 and the lower rotary arm 5 are pivotally joined with each other The base 1 is provided with at least one penetrating moveable slot 11 disposed on the base 1 obliquely, a shaft 12 inserted through the moveable slot 11, and a first return spring 13 arranged between the base 1 and the moveable seat 2. One end of the shaft 12 is mounted to the moveable seat 2 correspondingly while the other end of the shaft 12 is assembled with the hook 3. A second return spring 31 is mounted between the base 1 and the hook 3.

A lock cylinder 7 is mounted in the outer tube 6 and provided with a locked hook portion 71 exposed outside the outer tube 6 and a third return spring 72 disposed between the lock cylinder 7 and the upper rotary arm 4. The hook 3 is inserted through the locked hook portion 71 which is used for control of displacement of the hook 3. The upper rotary arm 4 is provided with a mounting hole 41 through which the lock cylinder 7 is inserted while the lower rotary arm 5 is provided with a mounting groove 51 in which the lock cylinder 7 is mounted.

Figure 4:
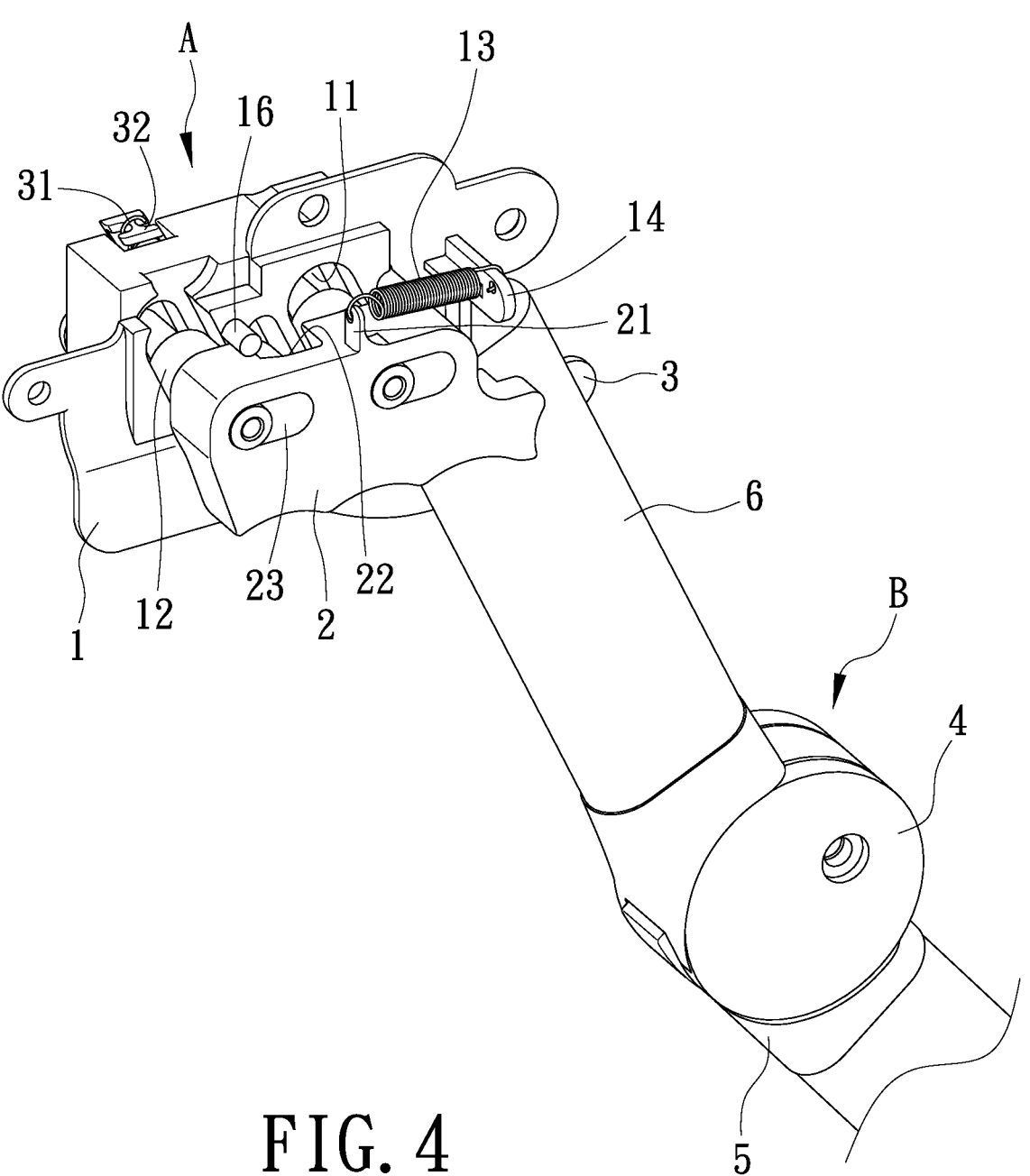
FIG. 4 is another perspective view of an embodiment viewed from a different angle according to the present invention.

Refer to FIG. 1-8, the two moveable slots 11 are obliquely-disposed on the base 1 and penetrating the base 1 and the shafts 12 are inserted through the slots 11 correspondingly. Two ends of the shaft 12 are connected with the moveable seat 2 and the hook 3 correspondingly. The base 1 and the moveable seat 2 are respectively arranged with a first lug 14 and a second lug 21 (as shown in FIG. 4). Then the first return spring 13 is mounted between the first and the second lugs 14, 21. The base 1 and the hook 3 are respectively provided with a first pin 15 and a protruding hook 32 while the second return spring 31 is arranged between the first pin 15 and the protruding hook 32.

Next a long slot 61 is formed on a wall of the outer tube 6 and the lock cylinder 7 is mounted in the outer tube 6. By a screw 710 inserted through the locked hook portion 71 and the long slot 61, the locked hook portion 71 is fastened on the lock cylinder 7 and exposed outside the outer tube 6. Then the hook 3 is inserted through the locked hook portion 71. Later the outer tube 6 and the pivotally connected upper and lower rotary arms 4, 5 are assembled with each other. The lock cylinder 7 is inserted through the mounting hole 41 of the upper rotary arm 4 and then mounted into the mounting groove 51 of the lower rotary arm 5. The lock cylinder 7 is further provided with a second pin 73. A positioning member 8 is threaded into the mounting hole 41 of the upper rotary arm 4 and the third return spring 72 is disposed between the second pin 73 and the positioning member 8.

Figure 5:
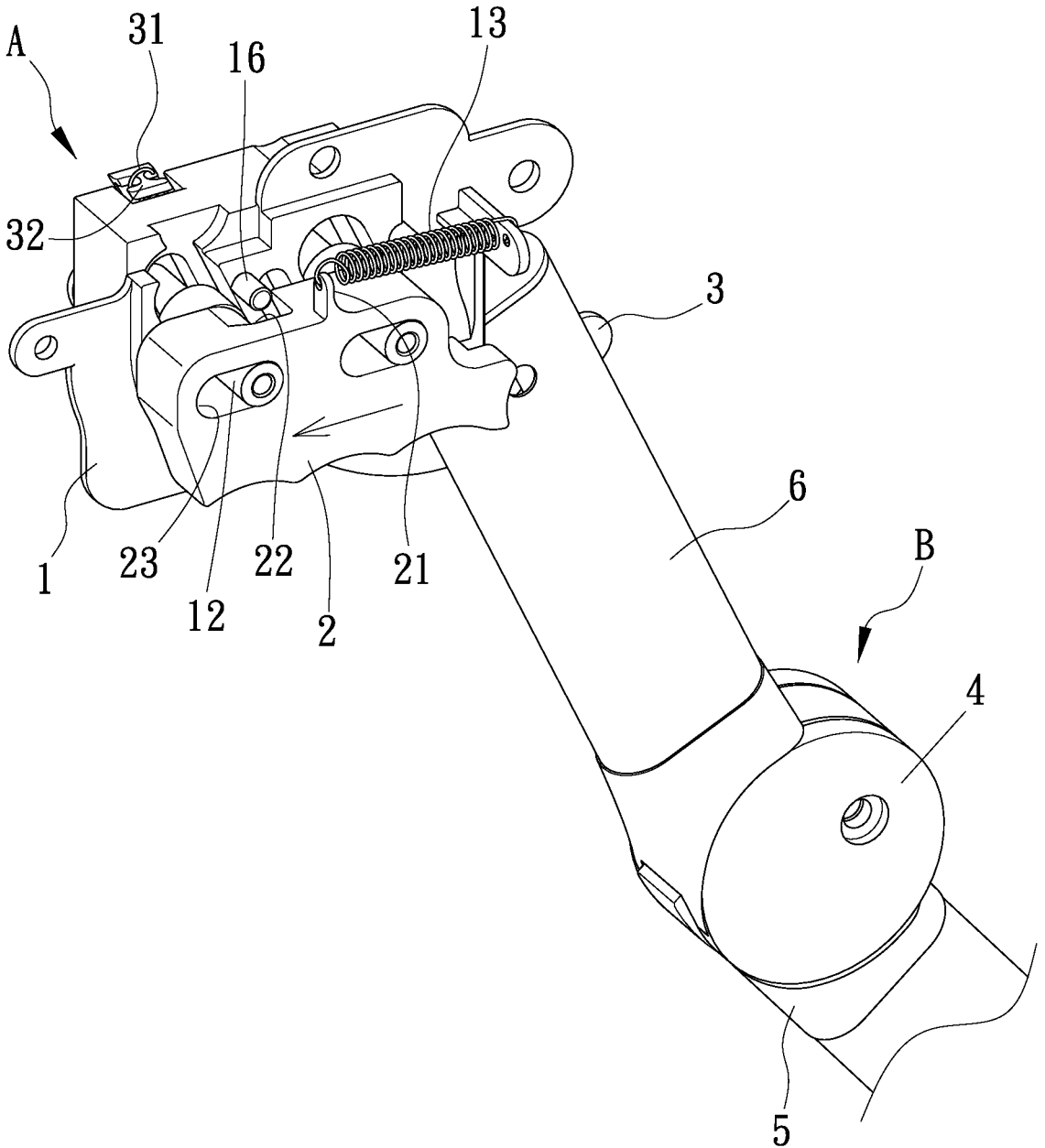
FIG. 5 is a perspective view of an embodiment in which a moveable seat is pulled according to the present invention.
Figure 6:
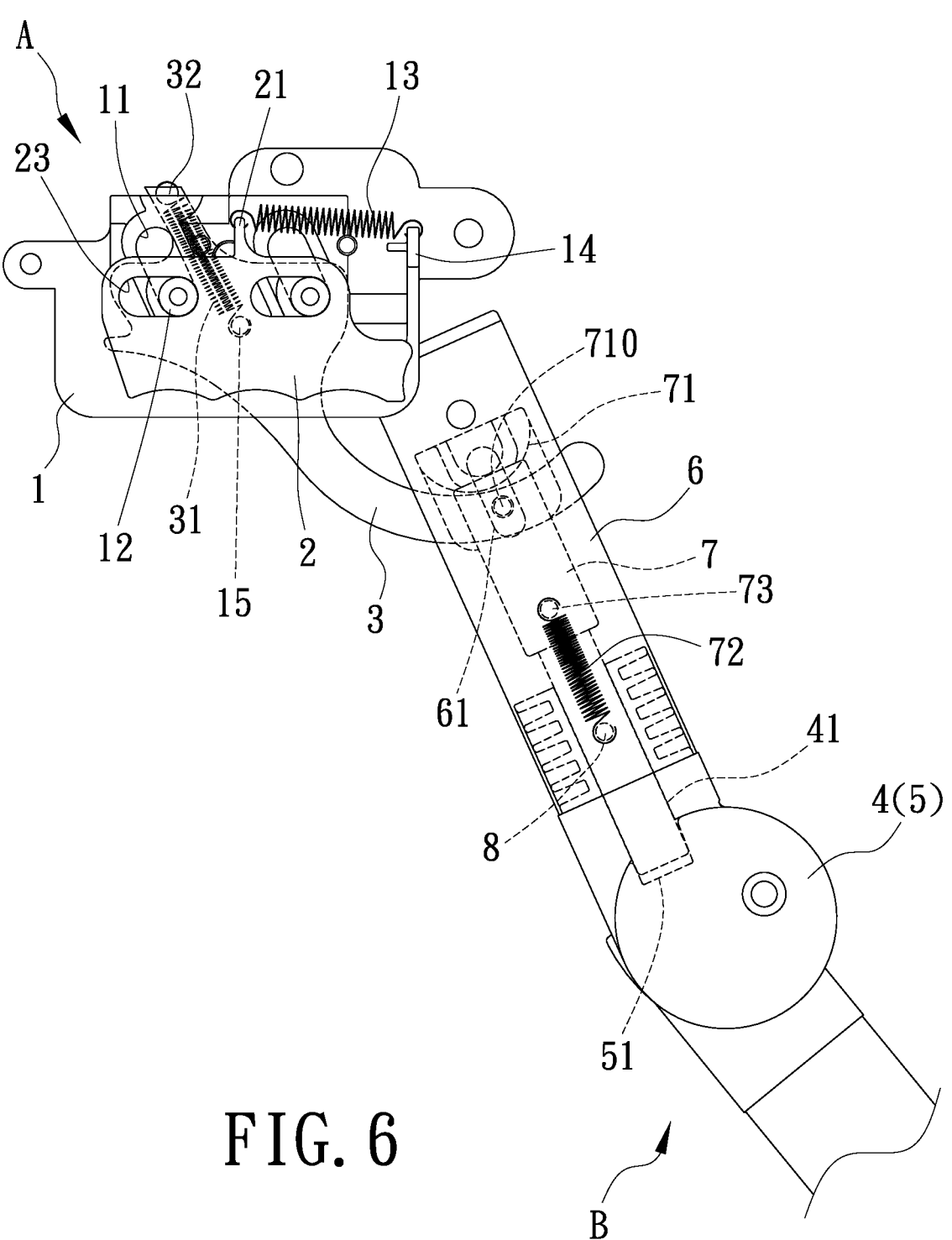
FIG. 6 is a schematic drawing showing a plan view of an embodiment in a locked state according to the present invention.
Figure 9:
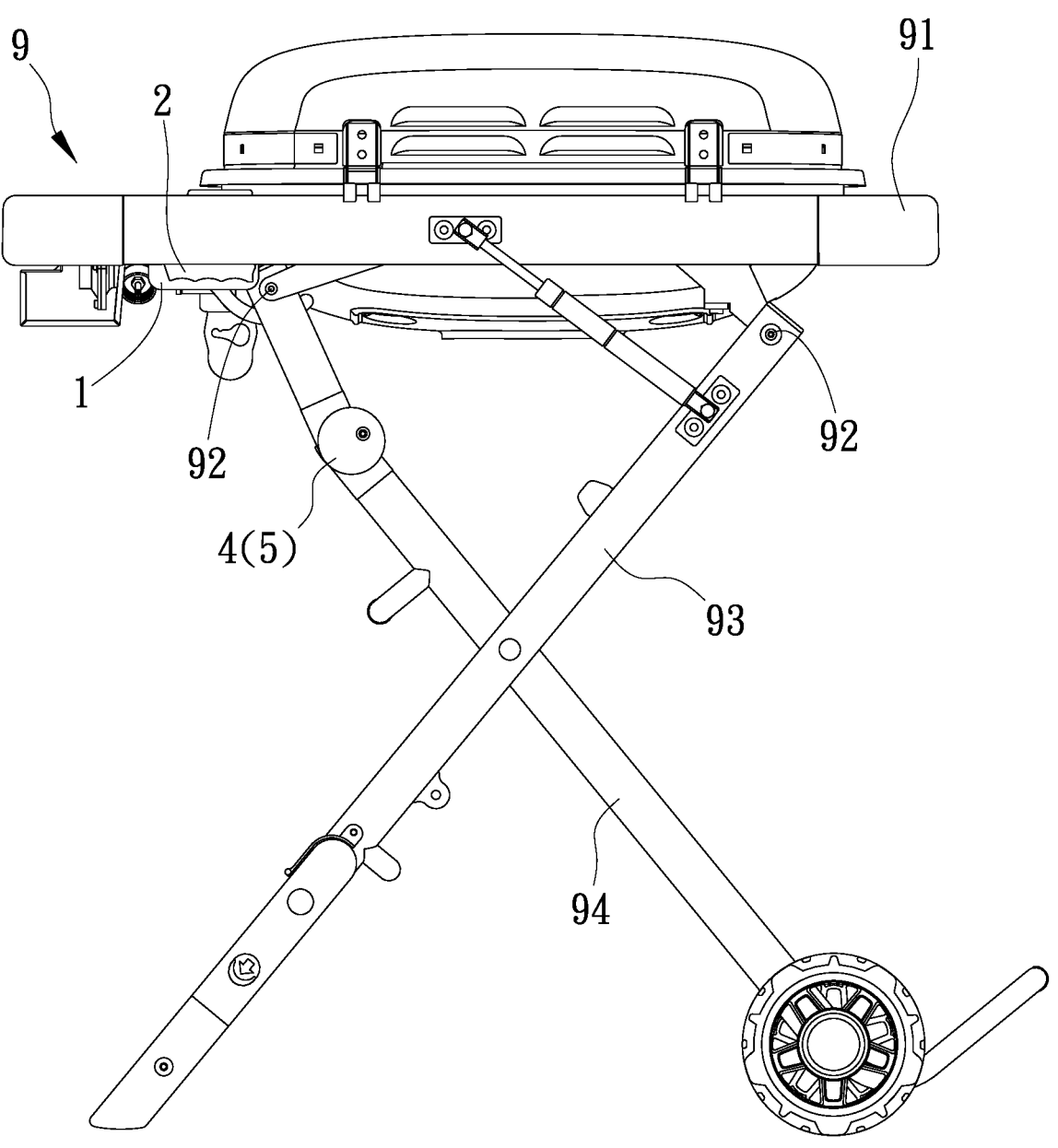
FIG. 9 is a schematic drawing showing an embodiment applied to a grill in a locked state according to the present invention.
Figure 10:
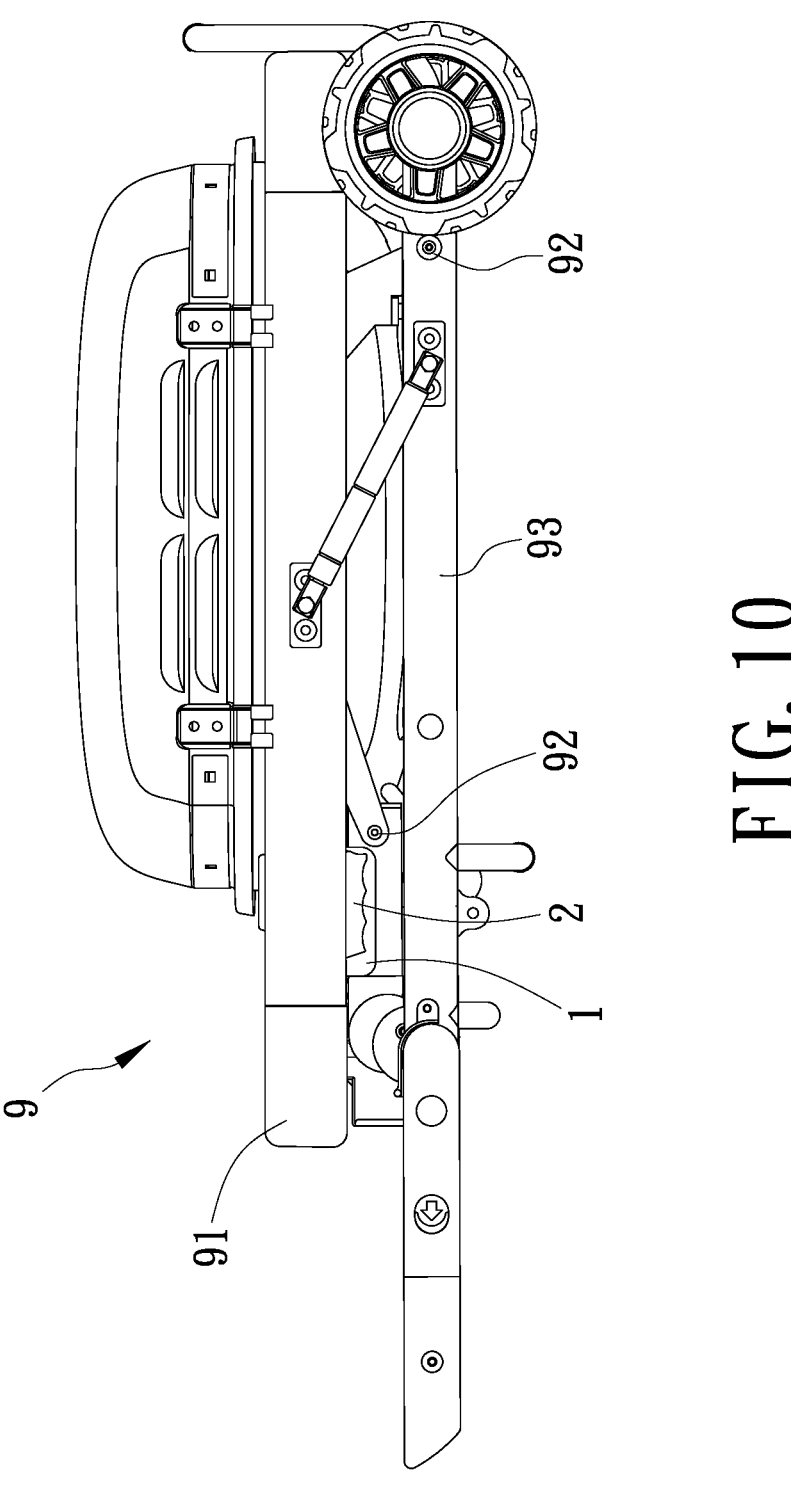
FIG. 10 is a schematic drawing showing an embodiment applied to a grill in an unlocked state according to the present invention.

While in use, the folding joint according to the present invention can be applied to frames and worktables including food trolleys, cribs, grills, etc. As shown in FIG. 9 and FIG. 10, the folding joint is applied to a grill 9. The base 1 is fastened under a worktable 91 of the grill 9. The worktable 91 is provided with two pivot portions 92. One of the pivot portions 92 is pivotally connected with the outer tube 6 correspondingly while the other pivot portion 92 is pivotally connected with a first support leg 93 correspondingly. The lower rotary arm 5 is pivotally connected with a second support leg 94 of the grill 9 correspondingly and the first and the second support legs 93, 94 are also pivotally connected with each other. While being extended, as shown in FIG. 6 and FIG. 9, the lock cylinder 7 is mounted in the mounting groove 51 of the lower rotary arm 5 correspondingly under driving of the third return spring 72. Now the joint portion B is locked so that the first and the second support legs 93, 94 of the grill 9 are extended. A fool-proofing technique is further provided. As shown in FIG. 1, FIG. 4, and FIG. 5, a fool-proofing pin 16 is disposed on the base 1 while a notch 22 is mounted on the moveable seat 2 and corresponding to the fool-proofing pin 16 in a staggered manner. By the fool-proofing pin 16 abutting against an end surface of the moveable seat 2, the moveable seat 2 will not be unlocked once being pulled accidentally.

Figure 7:
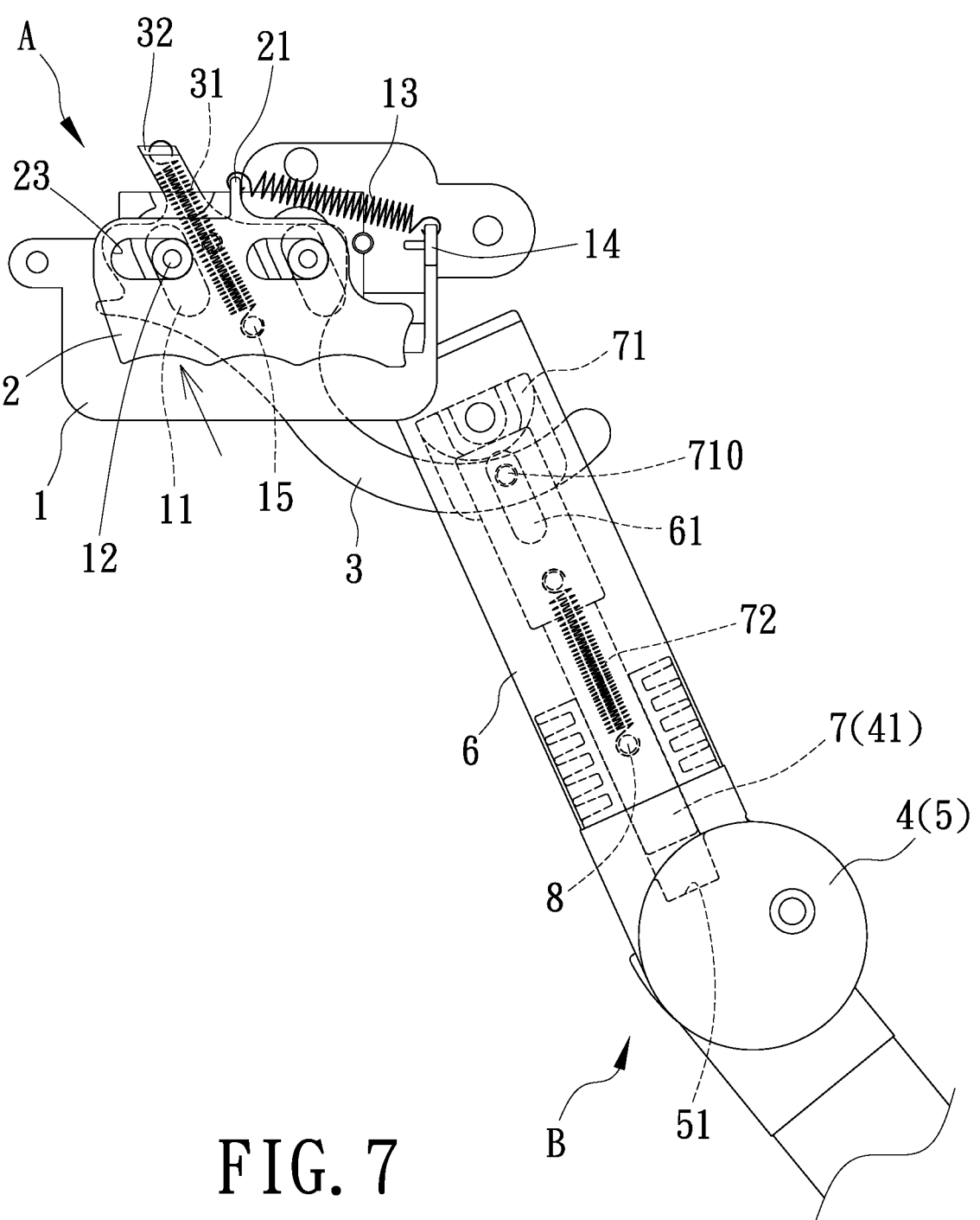
FIG. 7 is a schematic drawing showing a lock cylinder driven to move by a hook of an embodiment according to the present invention.
Figure 8:
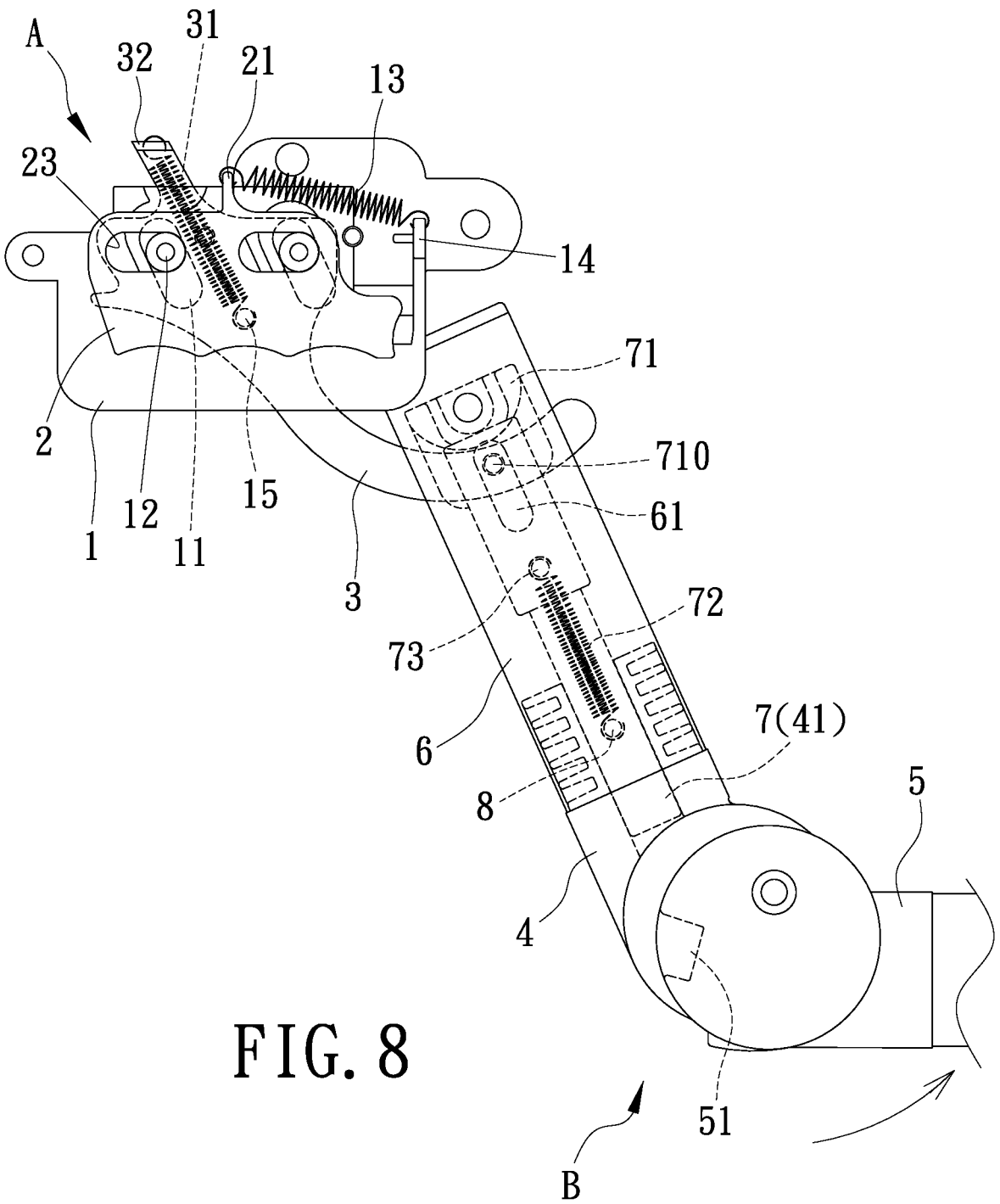
FIG. 8 is a schematic drawing showing rotation of a joint portion after unlocking of an embodiment according to the present invention.

While being folded, as shown in FIG. 5, the moveable seat 2 is provided with sliding slots 23 in which the shafts 12 are inserted correspondingly. The sliding slots 23 provide certain space allowing the moveable seat 2 to move with respect to the shafts 12. Through the sliding slots 23, the moveable seat 2 of the control portion A is pushed backward to stretch the first return spring 13 and make the fool-proofing pin 16 align with the notch 22. At the moment, the moveable seat 2 is able to be pulled upward. The shaft 12 is driven by the moveable seat 2 to move within the moveable slot 11 and the second return spring 31 on the hook 3 is also stretched. Then the hook 3 drives the locked hook portion 71 to move in the long slot 61 and the lock cylinder 7 is further moved to be released from the mounting groove 51 of the lower rotary arm 5 and unlocked. The third return spring 72 is also stretched. Now the upper and the lower rotary arms 4, 5 of the joint portion B are unlocked to be in a free state. Thereby the upper and power rotary arms 4, 5 are able to rotate with respect to each other and drive the first and the second support legs 93, 94 of the grill 9 to be folded (as shown in FIG. 7, FIG. 8, and FIG. 10).

When the grill 9 is extended again, the respective components are turned back by the first return spring 13, the second return spring 31, and the third return spring 72, as shown in FIG. 6.

According to the above embodiments, the present invention has the following advantages compared with the structure available now.

1. By pulling the moveable seat of the control portion to move, the hook is driven to make the lock cylinder release from the lower rotary arm and unlock. Thus the joint portion can be moved freely and folded for storage. The folding joint is convenient to operate and easy to control.

2. The present folding joint for frames and worktables is applied to various mechanisms so that the mechanisms are folded to minimize overall volume, save storage space and reduce transportation cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A folding joint for frames and worktables comprising:
a control portion and a joint portion;
wherein the control portion includes a base, a moveable seat, and a hook while the joint portion includes an upper rotary arm and a lower rotary arm pivotally joined with each other, and an outer tube arranged at the upper rotary arm;
wherein the base is provided with at least one penetrating moveable slot, a shaft inserted through the moveable slot, and a first return spring arranged between the base and the moveable seat; one end of the shaft is mounted to the moveable seat while the other end of the shaft is assembled with the hook; a second return spring is mounted between the base and the hook;
wherein a lock cylinder is mounted in the outer tube; the lock cylinder is provided with a locked hook portion exposed outside the outer tube, and a third return spring disposed between the lock cylinder and the upper rotary arm; the hook is inserted through the locked hook portion which is used for control of displacement of the hook; the upper rotary arm is provided with a mounting hole through which the lock cylinder is inserted and the lower rotary arm is provided with a mounting groove in which the lock cylinder is mounted.

2. The folding joint for frames and worktables as claimed in claim 1, wherein a fool-proofing pin is disposed on the base; a notch is mounted on the moveable seat and corresponding to the fool-proofing pin in a staggered manner; the moveable seat is able to be pulled and moved when the fool-proofing pin is aligned with the notch.

3. The folding joint for frames and worktables as claimed in claim 2, wherein the moveable seat is provided with a sliding slot through which the shaft is inserted; the sliding slot provides space allowing the moveable seat to move with respect to the shaft.

4. The folding joint for frames and worktables as claimed in claim 2, wherein a long slot is formed on a wall of the outer tube; a screw is provided to insert through the locked hook portion and the long slot for fastening the locked hook portion on the lock cylinder and the locked hook portion is exposed outside the outer tube; the long slot is used for allowing the locked hook portion and the lock cylinder to move in the outer tube.

5. The folding joint for frames and worktables as claimed in claim 2, wherein the moveable slot is obliquely disposed on the base.

6. The folding joint for frames and worktables as claimed in claim 2, wherein the base and the moveable seat are respectively provided with a first lug and a second lug; the first return spring is mounted between the first lug and the second lug.

7. The folding joint for frames and worktables as claimed in claim 2, wherein the base and the hook are respectively provided with a first pin and a protruding hook; the second return spring is disposed between the first pin and the protruding hook.

8. The folding joint for frames and worktables as claimed in claim 2, wherein the lock cylinder is provided with a second pin and a positioning member is threaded into the mounting hole of the upper rotary arm; the third return spring is arranged between the second pin and the positioning member.

9. The folding joint for frames and worktables as claimed in claim 1, wherein a long slot is formed on a wall of the outer tube; a screw is provided to insert through the locked hook portion and the long slot for fastening the locked hook portion on the lock cylinder and the locked hook portion is exposed outside the outer tube; the long slot is used for allowing the locked hook portion and the lock cylinder to move in the outer tube.

10. The folding joint for frames and worktables as claimed in claim 1, wherein the moveable slot is obliquely disposed on the base.

11. The folding joint for frames and worktables as claimed in claim 1, wherein the base and the moveable seat are respectively provided with a first lug and a second lug; the first return spring is mounted between the first lug and the second lug.

12. The folding joint for frames and worktables as claimed in claim 1, wherein the base and the hook are respectively provided with a first pin and a protruding hook; the second return spring is disposed between the first pin and the protruding hook.

13. The folding joint for frames and worktables as claimed in claim 1, wherein the lock cylinder is provided with a second pin and a positioning member is threaded into the mounting hole of the upper rotary arm; the third return spring is arranged between the second pin and the positioning member.

* * * * *